US006191173B1

(12) United States Patent
Schwertfeger et al.

(10) Patent No.: US 6,191,173 B1
(45) Date of Patent: Feb. 20, 2001

(54) PROCESS FOR THE PRODUCTION OF ORGANOFUNCTIONALIZED AEROGELS

(75) Inventors: Fritz Schwertfeger, Frankfurt; Andreas Zimmermann, Griesheim, both of (DE)

(73) Assignee: Hoechst Research Technology Deutschland GmbH, Frankfurt (DE)

(*) Notice: Under 35 U.S.C. 154(b), the term of this patent shall be extended for 0 days.

(21) Appl. No.: 09/043,144

(22) PCT Filed: Sep. 12, 1996

(86) PCT No.: PCT/EP96/03987

§ 371 Date: Jun. 15, 1998

§ 102(e) Date: Jun. 15, 1998

(87) PCT Pub. No.: WO97/10177

PCT Pub. Date: Mar. 20, 1997

(30) Foreign Application Priority Data

Sep. 15, 1995 (DE) ................................... 195 34 198

(51) Int. Cl.⁷ ................ C08J 3/02; C01B 33/12; B32B 27/02; B05D 7/00
(52) U.S. Cl. ............ 516/100; 423/338; 428/404; 427/220
(58) Field of Search ............ 516/100; 423/338; 428/404; 427/220

(56) References Cited

U.S. PATENT DOCUMENTS 3,969,261 * 7/1976 Meiller .......................... 252/179
5,134,110 * 7/1992 Sudo et al. .................... 502/401
5,705,535 * 1/1998 Jansen et al. .................... 521/64

FOREIGN PATENT DOCUMENTS 2433409   2/1975  (DE) .
2826664   12/1979 (DE) .
0443860 A2 8/1991 (EP) .

OTHER PUBLICATIONS

Chemical Abstracts, vol. 99, No. 11, Sep. 12, 1983.

Chemical Abstracts, vol. 95, No. 5, Aug. 3, 1981.

Derwent Publications, Week 8112, Jan. 25, 1980.

* cited by examiner

*Primary Examiner*—Jill Warden
*Assistant Examiner*—Monique T. Cole
(74) *Attorney, Agent, or Firm*—Frommer Lawrence & Haug LLP

(57) ABSTRACT

The invention relates to a process for preparing organofunctionally modified aerogels by gelling a water glass by means of polycondensation and then converting it, by drying while retaining the structure of the gel, to give an aerogel, which process comprises reacting the gel, before drying, with an at least bifunctional organic compound, at least one functional group serving as a bond to the aerogel, while the remainder are retained, to aerogels which are obtainable by the novel process, and to their use.

5 Claims, No Drawings

PROCESS FOR THE PRODUCTION OF ORGANOFUNCTIONALIZED AEROGELS

The invention relates to a process for preparing organofunctionalized aerogels, to organofunctionalized aerogels, and to their use.

Aerogels are highly porous materials of low density, which are prepared by forming a gel and then removing the liquid while retaining the structure of the gel.

According to a more precise definition (see, for example, Gesser and Goswani, Chem. Rev. 1989, 89, 767), aerogels are materials in which the liquid is removed from the gel under supercritical conditions, while the term xerogels is used if the gel is dried under subcritical conditions and cryogels in cases where the liquid is removed by sublimation from the frozen state.

For the purposes of the present invention, aerogels include all of these materials and may also contain, besides air, any other desired gases.

Because of their high porosity, aerogels have interesting physical properties which give them suitability for use as, inter alia, thermal insulation materials, acoustic materials, luminescent solar collectors, gas filters, catalysts and support materials.

For many of these applications, it is desirable to be able to modify the chemical properties of the aerogels, for example by incorporating functional groups.

DE-A-40 02 287 describes functionalized inorganic xerogels. However, the preparation conditions described therein do not give any products having gel structures, and therefore these are not aerogels for the purposes of the present invention.

U.S. Pat. No. 5,270,027 describes aerogels which have been etherified with amino alcohols. However, ether bridges of this type are not particularly stable in the long term, so that there is gradual cleavage of the organic groups.

EP-A 0 629 442 discloses aerogels which contain chelated transition metals and are catalysts, and Cao and Hunt (Mat. Res. Soc. Symp. Proc. 1994, Vol. 346, 631) describe amino functionalized aerogels.

Schubert et al. (Mat. Res. Soc. Symp. Proc. 1994, Vol. 346, 151, German Patent Application P 195 33 851.0) have synthesized aerogels having various functionalized radicals.

A common feature of all of these materials is that the aerogel on which they are based is prepared from tetraalkoxysilanes. However, these starting compounds represent, inter alia, an exceptionally high cost, which creates difficulties for preparation of the aerogels on an industrial scale.

It was therefore desirable to find a cost-effective process which is suitable for preparing organofunctional aerogels on an industrial scale.

Surprisingly, it has now been found that organofunctionally modified aerogels may be prepared using water glass as starting material.

It is known (see, for example, EP-A 0 396 076) that aerogels can be prepared from water glass and, if desired, (see, for example, EP-A 0 658 513) can be modified with unreactive organic radicals.

However, a possible modification with functional organic radicals cannot be found in these texts.

The invention therefore provides a process for preparing organofunctionally modified aerogels by gelling a water glass by means of polycondensation and then converting it, by drying while retaining the structure of the gel, to give an aerogel, which process comprises reacting the gel, before drying, with an at least bifunctional organic compound, at least one functional group serving as a bond to the aerogel, while the remainder are retained.

For the purposes of the invention, the term organofunctionally modified means that the aerogel, preferably on the inner surface, contains identical or different organic radicals which have at least one, preferably one, two or three, functional groups. The term functional groups here means structures which are in the organic radicals and have polar atomic bonds, preferably resulting from the presence of heteroatoms.

Examples of functional groups are halogens, pseudohalogens, hydroxyl, thio, amino, amido, ether, ester, acid, formyl and keto.

According to the invention, the aerogels are prepared from water glass. The term water glass is taken to mean water-soluble alkali metal silicates, preferably sodium and/or potassium silicates. For the purposes of the invention, the term also includes water-soluble complex alkali-metal metallates of other metals, such as Al, Ti, Zr and Sn, but Si water glass is preferred. Commercially available water glasses comprise 2 [lacuna].

The functional organic compound contains at least one group, for example a halo, preferably chloro, alcohol, ether, acid, preferably carboxylic acid, or ester function, which enables it to react with the original hydroxyl or ether groups of the aerogel surface. The compounds may, for example, be amino alcohols of the formula $R^1$—NH—$R^2$—OH, where $R^1$=H, $C_1$–$C_4$-alkyl or —$(CH_2)_{2-3}$—OH and $R^2$=$C_1$–$C_4$-alkylene.

However, preference is given to functional organic compounds of the formula $$R_n-MX_m$$

where M is Si, Al, Zr, Ti or Sn, preferably Si, and n and m are integers greater than zero, the sum of which corresponds to the valence of M. R is a $C_1$–$C_{22}$-hydrocarbon radical which contains at least one functional group, preferably selected from the class consisting of OH, $OR^3$, $COOR^3$, $OCOR^3$, $SO_3R^3$, $SO_2Cl$, F, Cl, Br, $NO_2$, CN, SCN, —NCO, —OCN, $NR^3_2$, —$CONR_2$, —O—CO—O—, oxiran-2,3-diyl and $SR^3$, where $R^3$ may be identical or different and is H, $C_1$–$C_{20}$-alkyl or $C_4$–$C_{10}$-aryl; the radicals $R^3$, independently of one another, are identical or different or may be bridged. X is a halogen, preferably Cl, or a radical —$OR^4$, —$SR^4$ or —$NR^4_2$ where $R^4$ is H, a straight-chain or branched $C_1$–$C_{18}$ aliphatic radical, benzyl or $C_4$–$C_{10}$-aryl.

If m is at least two, the radicals X, independently of one another, may be identical or different or bridged. The index n is preferably 1 or 2, particularly preferably 1.

It is also possible to use mixtures of two or more functional organic compounds.

Particular preference is given to functional organic compounds in which R is —Y—Z, where Y is $C_1$–$C_8$-alkylene, preferably straight-chain, $C_1$–$C_8$-alkenylene or —$[(CH_2)_2O]_n$—$CH_2$, where n=1, 2 or 3;

Z is F, Cl, Br, I, CN, SCN, —NCO, —OCN, NR'R", OR', SR', PR'R" or oxiran-2-yl;

R' and R" are identical or different and are H, $C_1$–$C_{12}$-alkyl, $C_4$–$C_{10}$-aryl or benzyl.

Other preferred functional organic compounds are those of the type $R_nR^5_sMX_m$, where n, s and m are natural numbers and together correspond to the valence of M and where R, M and X are as defined above. $R^5$ is hydrogen or an unreactive organic linear, branched, cyclic, aromatic or heteroaromatic radical, such as $C_1$–$C_{18}$-alkyl, preferably $C_1$–$C_6$-alkyl, particularly preferably methyl or ethyl, cyclohexyl or phenyl; the radicals $R^5$, independently of one another, are identical or different or may be bridged.

The functional organic compound is generally used in a proportion of up to 30% by weight, preferably 20% by weight, particularly preferably 10% by weight, based on the undried aerogel.

By reacting with functional organic compounds, the original surface groups are replaced by groups of the type $MR_n$ and/or $MR_nR^5_s$.

The compounds of the formula $R_nMX_n$ are commercially obtainable or can be prepared by methods known per se and familiar to the person skilled in the art.

Methods of this type are described, for example, in the article "Hybrid Inorganic-Organic Materials by Sol-Gel Processing of Organofunctional Metal Alkoxides" (U. Schubert et al., Chem. Mat., 1995, 7, 2010).

Preparation methods for the preferred organoalkoxysilanes, such as the hydrosilylation of unsaturated compounds with a subsequent alcoholysis:

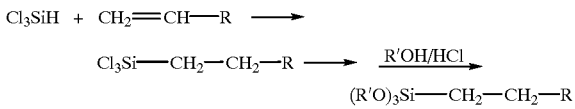

are described, inter alia, in W. Noll, Chemie und Technologie der Silicone [Chemistry and Technology of the Silicones], Verlag Chemie, Weinheim, 1968 and U. Deschler, P. Kleinschmit, P. Panster, Angew. Chem. 1986, 98, 237 (Int. Ed. Engl. 1986, 25, 236).

There are numerous individual examples in Silane Coupling Agents, E. P. Plueddermann, 2nd Edition, Plenum Press, New York, 1991, pp. 31–54.

Examples of commercially available compounds are alkoxysilanes (alkyl-O)$_3$-SiR, in which R is acetoxypropyl, N-(3-acryloxy-2-hydroxypropyl)-3-aminopropyl, 3-acryloxypropyl, 3-(N-allylamino)propyl, allyl, 4-aminobutyl, (aminoethylaminomethyl)phenethyl, N-(2-aminoethyl)-3-aminopropyl, N-(6-aminohexyl)aminopropyl, 3-(3-aminophenoxy)propyl, aminophenyl, 3-(1-aminopropoxy)-3,3-dimethyl-1-propenyl, 3-aminopropyl, w-aminoundecyl, amyl, benzyl, 5-biscycloheptenyl, bis(2-hydroxyethyl)-3-aminopropyl, bromooctyl, bromoethyl, bromophenyl, 3-bromopropyl, 3-butenyl, chloroethyl, chlorophenyl, 3-chloropropyl, 2-(4-chlorosulfonylphenyl)ethyl, 2-cyanoethyl, 3-cyanopropyl, 2-(3-cyclohexenyl)ethyl, (N,N-diethyl-3-aminopropyl), diethylphosphatoethyl, diethyl (trimethylsilylmethyl) malonate, N,N-dimethylaminopropyl, 2-(diphenylphosphino)ethyl, 2-(3,4-epoxycyclohexyl)ethyl, 3-(4-formylphenoxy)propyl, GLYMO, 3-(heptafluoroisopropoxy), iodopropyl, 3-isocyanatopropyl, 3-mercaptopropyl, methacrylamidopropyl, MEMO, 3-(4-methoxyphenoxy)propyl, styrylethyl, 3-thiocyanatopropyl, N-(triethoxysilylpropyl)dansylamides, fluoro compounds and/or diethylenediaminopropyl.

The functional organic compounds may also be used in a mixture with unreactive surface-modified substances of the formula $R^6_nMX_m$. Original surface groups are to some extent replaced here by inert groups of the type $MR^6_n$. The indices n and m are integers greater than zero, the total of which corresponds to the valence of M, which is as defined above. $R^6$ is hydrogen or an unreactive organic linear, branched, cyclic, aromatic or heteroaromatic radical, such as $C_1$–$C_{18}$-alkyl, preferably $C_1$–$C_6$-alkyl, particularly preferably methyl or ethyl, cyclohexyl or phenyl; the radicals $R^6$, independently of one another, are identical or different or may be bridged. X moreover is halogen, preferably Cl, or a radical —$OR^7$, —$SR^7$ or —$NR^7_2$, where $R^7$ is a straight-chain or branched, unsubstituted or substituted $C_1$–$C_{18}$ aliphatic radical.

If m is at least two, then the Xs, independently of one another, may be identical or different or bridged. It is also possible to use mixtures of the surface-modifying substances.

Preference is given to the use of surface-modifying substances of the formula $R^6_{4-n}SiCl_n$ or $R^6_{4-n}Si(OR^7)_n$, where n is from 1 to 3, where $R^6$ and $R^7$ are as defined above. Silazanes are also suitable. Preference is given to the use of methyltrichlorosilane, di methyldichlorosilane, trimethylchlorosilane, trimethylmethoxysilane or hexamethyldisilazane.

These compounds are likewise commercially available or may be prepared by methods known per se and familiar to the person skilled in the art.

Methods of this type are described, for example, in the article "Hybrid Inorganic-Organic Materials by Sol-Gel Processing of Organofunctional Metal Alkoxides" (U. Schubert et al., Chem. Mat., 1995, 7, 2010).

Preference is given to mixtures of non-functional and functional surface-modifying substances in a ratio of from 0:1 to 1:1, preferably from 0:1 to 0.5:1.

The novel process is described below using the example of silicatic water glass.

A preferably aqueous solution of water glass is firstly converted to silicic acid by adding acid and then polycondensed in strongly acid or basic [lacuna] to give a gel (silicic acid hydrogel). Preference is given to using an acid ion-exchange resin or a mineral acid to bring an aqueous water glass solution to a pH of <3.0 and adding a base to polycondense the resultant silicic acid to give an $SiO_2$ gel. If a mineral acid was used in the first step, the gel is preferably washed with water until essentially free of electrolytes.

Preference is given to the use of an acid ion-exchange resin, especially those which contain sulfonic acid groups. If mineral acids are used, hydrochloric and sulfuric acid are particularly suitable. The water glass used is generally sodium and/or potassium water glass.

In the second step, the polycondensation, the base used is generally $NH_4OH$, NaOH, KOH, $Al(OH)_3$ and/or colloidal silicic acid. If mineral acid was used at the outset, the $SiO_2$ gel produced with the aid of the base is washed with water until free of electrolytes, the washing being preferably continued until the discharged washing water has the same electrical conductivity as demineralized water.

Before the solvent exchange which follows, the gel obtained is preferably allowed to age, generally at from 0 to 100° C., preferably at from 60 to 100° C., and at a pH of from 4 to 11, preferably from 4 to 8. The time for this is generally from 10 seconds to 48 hours, preferably from 10 seconds to 5 hours.

The water present in the gel is then expelled by means of a preferably low-boiling organic liquid which is inert with respect to the gel.

The gel is preferably washed with the organic liquid until the water content is less than 2% by weight. The organic liquids used are generally aliphatic alcohols, ethers, esters or ketones or aliphatic or aromatic hydrocarbons. Preferred solvents are methanol, ethanol, n-propanol, isopropanol, acetone, tetrahydrofuran, ethyl acetate, dioxane, n-hexane and toluene. Mixtures of the liquids mentioned may also be used. It is also possible firstly to wash out the water with a water-miscible liquid, for example an alcohol, and then to expel this with a hydrocarbon.

In particular if supercritical drying is envisaged, the solvent may be exchanged for another liquid, such as methanol or acetone, in a further step.

The steps as far as this point are generally carried out at a temperature between the freezing point and the boiling point of the organic liquid.

If the functional organic compound has not already been added to the water glass or silicic acid solution, i.e. before the formation of the gel, it is preferably added to the gel containing liquid.

The surface-modified aerogel is supercritically or subcritically dried in the following step by generally known methods familiar to the person skilled in the art.

The drying of the gel under supercritical conditions may be based for example on the processes described in EP-A-0 067 741 (=U.S. Pat. No. 4,432,956) and in U. Schubert et al., J. Non-Cryst. Solids, 1995, 186, 37–43.

Critical constants for solvents are given in the known sets of tables, e.g. in the Handbook of Chemistry and Physics, 40th Edition (1958), pages 2302–2304. For example, the critical temperature and the critical pressure for carbon dioxide are 31.1° C. and 73.0 atm., for methanol 240° C. and 78.7 atm., for ethanol 243.1° C. and 63.1 atm., for n-propanol 263.7° C. and 49.95 atm. and for isopropanol 235° C. and 53 atm.

For reasons of cost, preference is given to supercritical drying from an alcohol, such as methanol, or from acetone.

In general, however, subcritical drying is preferred, the gel being dried at a temperature below the critical temperature of the liquid contained in the gel and at a pressure of from 0.001 bar to the vapor pressure of this liquid at this temperature.

In a particular embodiment, the surface-modified gel is dried at temperatures of from −30 to 200° C., preferably from 0 to 2000° C., and at a pressure of from 0.001 to 20 bar, preferably from 0.01 to 5 bar, particularly preferably from 0.1 to 2 bar. Temperatures higher than 200° C. and/or pressures higher than 20 bar are certainly possible, but they are associated with superfluous cost and do not bring any advantages. The drying is generally continued until the gel has a residual solvent content of less than 0.1% by weight.

Examples of suitable drying processes are contact and convection drying. In convection drying, the gas or gas mixture may also impact the lyogel at relatively high temperature.

The drying of the gel may moreover be significantly accelerated by using dielectric drying processes, e.g. microwave drying. For this, the solvent is exchanged, if necessary and after the surface modification, for a solvent which has good microwave absorption, such as water, ethanol or preferably acetone. The gels may then be dried rapidly in a microwave drier.

The products of the novel process are to some extent known and to some extent novel.

The invention therefore also provides aerogels containing hydrocarbon radicals which have at least one functional group, where the following aerogels are excluded:

a) Aerogels containing functional radicals of the formula (I)

—Y—Z  (I)

where
Y is a straight-chain or branched alkylene group having from 1 to 22 carbon atoms;
Z is halogen, pseudohalogen, $SR^1$, $PR^2R^3$, oxirane, $CH_2=C(CH_3)—COO—$
$R^1$ is H, a straight-chain or branched alkyl group having from 1 to 22 carbon atoms or an aryl group having from 4 to 10 carbon atoms and $R^2$ and $R^3$ are identical or different and are a straight-chain or branched alkyl group having from 1 to 22 carbon atoms or an aryl group having from 4 to 10 carbon atoms;

b) Aerogels modified with amino alcohols of the formula $R^1—NH—R^2—OH$, where $R^1=H$, $C_1–C_4$-alkyl or $—(CH)_{2-3}—OH$ and $R^2=C_1–C_4$-alkylene, which are bonded to the aerogel via an ether bridge;

c) Aerogels modified with $—(CH_2)_3—NH_2$ or $—(CH_2)_3—NH—(CH_2)_2—NH_2$;

d) Aerogels modified with radicals of the formula (III)

$$R^2R^3N—(CHR^4)_n—N(R^5)—(CHR^6)_b—Si(OR^1)_3 \quad (III)$$

where
$R^1$ is alkyl having from 1 to 8 carbon atoms,
$R^2$ and $R^3$ may be identical or different and are hydrogen, alkyl having from 1 to 4 carbon atoms or phenyl,
$R^4$ and $R^5$ are identical or different and are hydrogen or alkyl having from 1 to 4 carbon atoms,
a is an integer from 1 to 4 and
b is an integer from 1 to 8,
where these groups are complexed with Pd, Pt, Ni, Co and/or Cu.

The invention also provides an aerogel obtainable by the novel process, where the above exclusions preferably apply.

Preference is given to products in which the functionalized hydrocarbon radical is bonded to a metal (and/or semimetal atom) of the aerogel.

It is also possible for more than one functionalized hydrocarbon to be bonded to the same metal (semimetal) atom of the aerogel.

The functionalized hydrocarbon radical is particularly preferably an unbranched or branched alkyl having from 1 to 22, preferably from 1 to 12 carbon atoms, where one or more $CH_2$ groups may be replaced by —O—, —S—, —CO—, —COO—, —O—CO—O—, —CO—NR'—, —SO—, —SO$_2$—, —NH—CO—NH—, $C_3$–$C_6$-cycloalkylene, —CH=CH—, —C≡C— or a $C_4$–$C_{10}$-arylene group, which may also have heteroatoms (such as N, S or O), and one or more hydrogen atoms may be replaced by F, Cl, Br, I, CN, SCN, —NCO, —OCN, NO$_2$, SO$_3$R', PR'$_2$, CHO, where R' are identical or different and are H, $C_1$–$C_{12}$-alkyl, $C_4$–$C_{10}$-aryl or benzyl.

The functionalized hydrocarbon radical is very particularly preferably —Y—Z,
where
Y is $C_1$–$C_8$-alkylene, preferably straight-chain, $C_1$–$C_8$-alkenylene or $—[(CH_2)_2O]_n—CH_2$, where n=1, 2 or 3;
z is F, Cl, Br, I, CN, SCN, —NCO, —OCN, NR'R", OR', SR', PR'R" or oxiran-2-yl;
R' and R" are identical or different and are H, $C_1$–$C_{12}$-alkyl, $C_4$–$C_{10}$-aryl or benzyl.

The novel aerogels and the aerogels prepared by the novel process preferably have porosities of 70% and greater, particularly preferably 80% and greater. Their density is preferably 200 kg/m³ or below, particularly preferably 150 kg/m³ or below.

The invention likewise provides the abovementioned aerogels which additionally are modified with unreactive hydrocarbon radicals or heterocyclic radicals.

It is also possible for functionalized hydrocarbon radicals and unreactive radicals to be bonded to the same metal or semimetal atom.

The novel aerogels and the aerogels prepared by the novel process may furthermore contain commercially available additives, such as pigments and/or carbon black.

It is likewise possible to add fibers to the sol before preparation of the gel in order to increase mechanical stability. Fibrous materials which may be used are inorganic fibers, such as glass fibers or mineral fibers and organic fibers, such as polyester fibers, aramide fibers, nylon fibers or fibers of vegetable origin, and mixtures of these. The fibers may also be coated, for example polyester fibers metallized with a metal, such as aluminum.

Examples of applications for which the novel aerogels are suitable are catalyst precursors, e.g. for binding metal ions or metal complexes, and sensors.

The invention is explained in further detail by means of examples, without being limited thereby.

EXAMPLE 1

1 l of a sodium water glass solution (having a content of 7% by weight of $SiO_2$ and a ratio of $Na_2O:SiO_2$ of 1:3.3) is stirred together with 0.5 l of an acid ion-exchange resin (styrene-divinylbenzene copolymer with sulfonic acid groups, commercially available under the name ®Duolite C20) until the pH of the aqueous solution is 2.7. The ion-exchange resin is then filtered off and the aqueous solution adjusted with one molar NaOH solution to a pH of 4.7. The resultant gel is then aged for 6 hours more at 85° C. and then the water extracted with 3 l of acetone. The acetone-containing gel is then treated with chloropropyltrichlorosilane (50 mg of chloropropyltrichlorosilane per gram of wet gel). After a reaction time of 5 hours, the wet gel is washed with 1 l of acetone. The gel is dried in air (3 hours at 40° C., then 2 hours at 50° C. and 12 hours at 150° C.).

The resultant aerogel has a density of 0.15 g/cm³. The BET specific surface area is 640 m²/g.

EXAMPLE 2

1 l of a sodium water glass solution (having a content of 7% by weight of $SiO_2$ and a ratio of $Na_2O:SiO_2$ of 1:3.3) is stirred together with 0.5 l of an acid ion-exchange resin (styrene-divinylbenzene copolymer with sulfonic acid groups, commercially available under the name ®Duolite C20) until the pH of the aqueous solution is 2.7. The ion-exchange resin is then filtered off. The solution is mixed with chloropropyltrichlorosilane (50 mg of chloropropyltrichlorosilane per gram of solution) and, using one molar NaOH solution, adjusted to a pH of 4.7. The resultant gel is then aged for 24 hours more at 85° C. and then the water extracted with 3 l of acetone. The gel is dried in air (3 hours at 40° C., then 2 hours at 50° C. and 12 hours at 150° C.).

The resultant aerogel has a density of 0.21 g/cm³. The BET specific surface area is 580 m²/g.

What is claimed is:

1. A process for the preparation of organofunctionally modified aerogels, said process comprises gelling a water glass by polycondensation and then converting the product to an aerogel by drying with retention of the gel structure, said process characterized in that, before drying, the gel is reacted with an organic compound that is at least bifunctional, with at least one of the functional groups linking said organic compound to the aerogel, and at least one of the other functional groups, which contain hydrocarbon residues that have at least one functional group, is preserved.

2. Aerogels obtained by the process claimed in claim 1.

3. A method of using the aerogels containing hydrocarbon residues which have at least one functional group produced by the process as claimed in claim 1 as a catalyst precursor or sensor.

4. A catalyst which comprises an aerogel as claimed in claim 1.

5. A sensor which comprises an aerogel as claimed in claim 1.

* * * * *